June 10, 1930.    L. L. CUSTER    1,762,507
AERIAL AMUSEMENT DEVICE
Filed Aug. 28, 1926    2 Sheets-Sheet 1
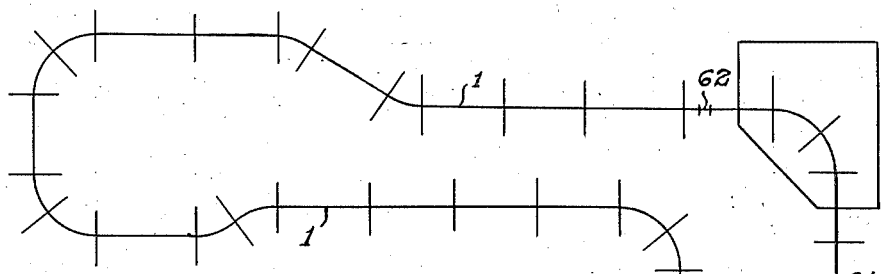
Fig.1.
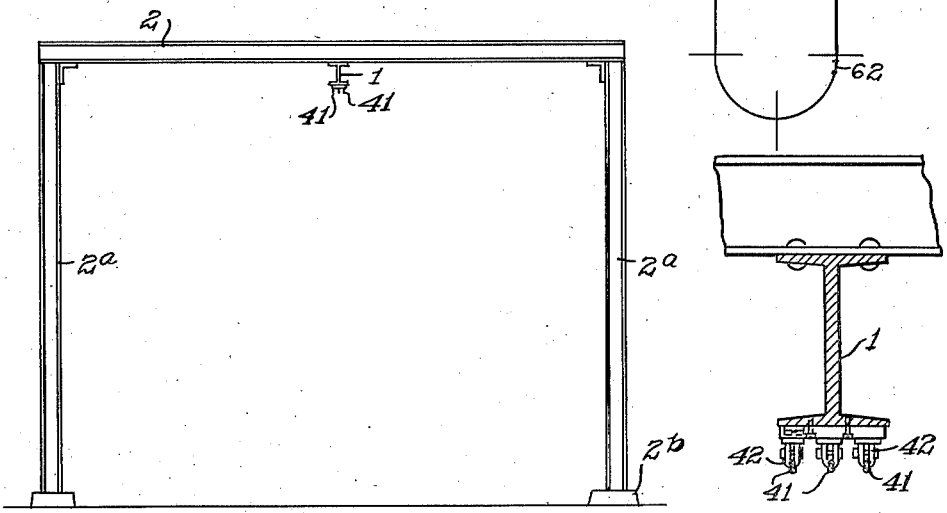
Fig.2.    Fig.3.
Fig.4.
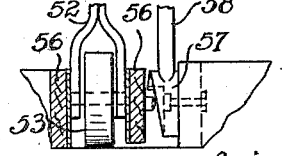
Fig.6.
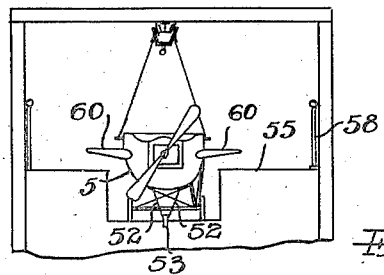
Fig.5.
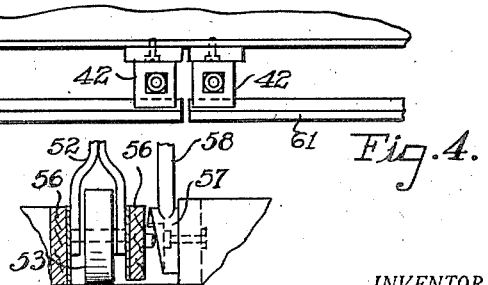
INVENTOR.
Levitt Luzern Custer
BY Howard S. Smith,
His ATTORNEY.

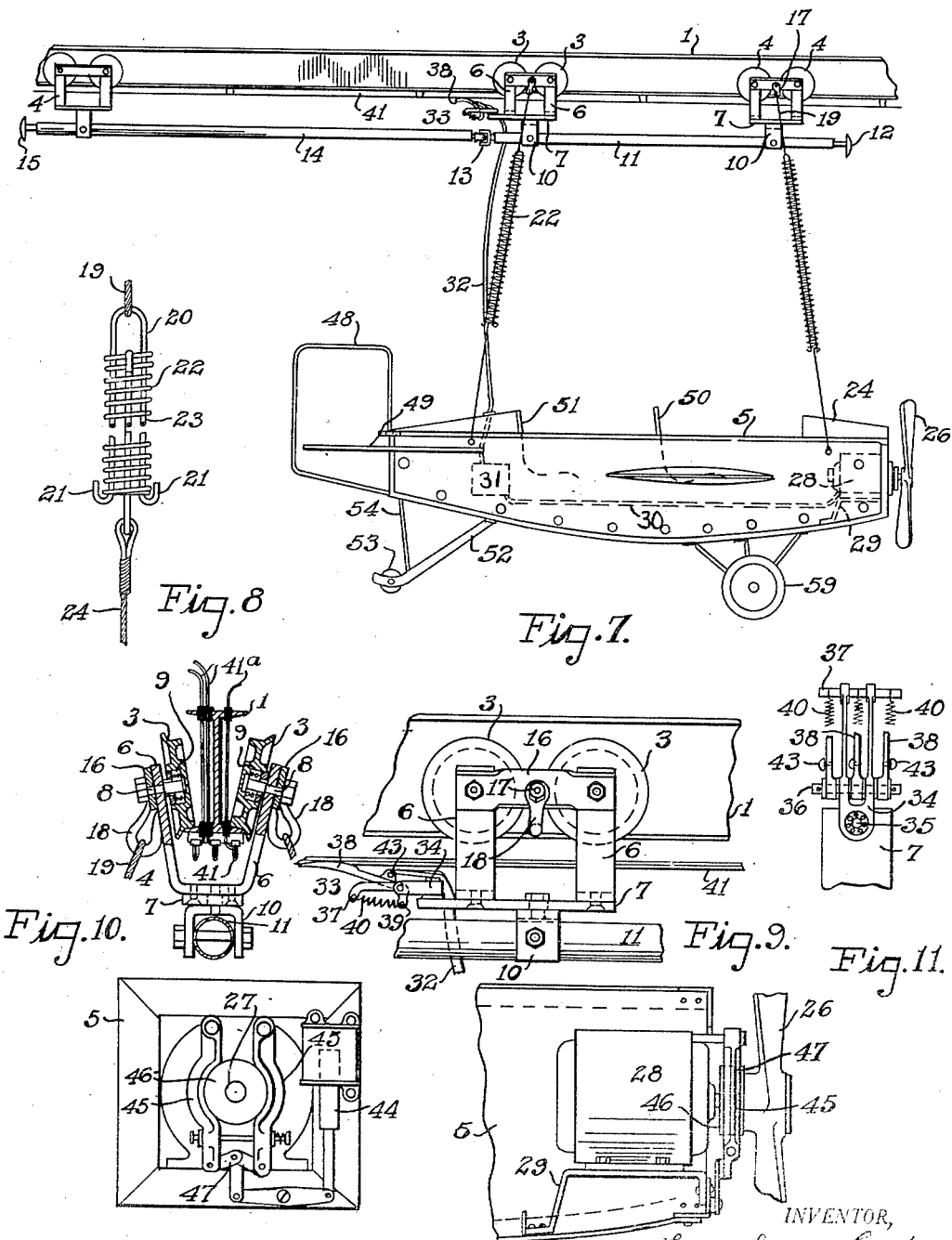

Patented June 10, 1930

1,762,507

UNITED STATES PATENT OFFICE

LEVITT LUZERN CUSTER, OF DAYTON, OHIO

AERIAL AMUSEMENT DEVICE

Application filed August 28, 1926. Serial No. 132,192.

This invention relates to new and useful improvements in aerial amusement devices.

It is the principal object of my invention to provide for amusement parks and other places, a ride which is not unlike that of an airplane flying through the air. The device contemplates the provision of an overhead track such as may be afforded by a rail or cable, for a carrier from which there is suspended a body that may imitate an airplane fuselage, car, boat or the like. It is preferred that the body be driven by a propeller of aerofoil section which is rotated by a motor carried by the body and which receives electric current from wires stretched beneath the track.

It is a further object of my invention to provide safety devices to be hereinafter described for protecting the passengers from accident when boarding, leaving or riding in the aerial body.

My aerial device also lends itself to commercial usage such as a carrier for passengers and freight over rivers, valleys and level surfaces.

Other important and incidental objects will be brought out in the following specification and particularly set forth in the subjoined claims.

In the accompanying drawings illustrating one form of embodiment of my invention, Figure 1 is a plan view of an overhead track that may be employed for my aerial device, showing the loading platform and the safety sections of the electric conductor. Figure 2 is a front view of one of the track supporting frames. Figure 3 is an enlarged sectional view showing one of the supports for the electric conductors. Figure 4 is a side elevational view of a safety section of an electric conductor. Figure 5 is a front view of the device, with the wings on the fuselage over the loading platforms to permit the passengers to step from the latter upon the wings and thence into the carrier body. Figure 6 is a cross sectional view taken through the clamping means for engaging the tail skid of the passenger-carrying body at the loading platform. Figure 7 is a side view of one of the carrier bodies, the trucks from which it is suspended and the overhead track. Figure 8 is a detail view of one of the spring suspension members. Figure 9 is a side view of one of the carrier trucks. Figure 10 is a sectional view taken through one of the carrier trucks. Figure 11 is a plan view of one of the trolley units. Figure 12 is a front view of the electric motor, showing the solenoid brake for the same. And Figure 13 is a side view of said motor and brake.

Referring to the accompanying drawings for a detailed description of my invention, the numeral 1 designates an I beam section of metal which, together with other similar sections disposed end to end, form an overhead track that may be arranged in the form shown in Figure 1, or in any other desired manner. These I beam sections 1 are riveted or otherwise firmly secured to cross supports 2 that are mounted upon standards 2ª resting upon bases 2ᵇ anchored in the ground. (See Figure 2.)

Free to travel upon the bottom flanges of the I beam sections 1, are the wheels 3 of a carrier truck 4. There are two of these trucks for each fuselage body 5 to be hereinafter described, each truck preferably comprising two U-shaped members 6, 6 which straddle the track at their upper ends and are connected at their bottom portions by a plate 7. (See Figures 9 and 10.) Projecting at right angles through the upper part of each U-shaped member 6 is a stud 8 carrying on its inner end a ball bearing 9 for a respective wheel 3, these studs being upwardly inclined to support the wheels 3 in the slanting positions shown in Figure 10.

Pivotally secured to the bottom of each plate 7 is an inverted U-shaped piece 10. To the pieces 10, 10 belonging to the trucks 4, 4 of a fuselage body 5 there is secured a stop or protecting rod 11, the front end of which terminates in a mushroom shaped bumper head 12 and whose rear end is connected, by a universal coupling 13, to a similar rod or bar 14. The rear end of the latter also terminates in a bumper head 15 and is secured to a carrier truck 4 which travels upon the track 1 behind the front trucks 4, 4 to protect the body

5 suspended from them against another carrier colliding with it.

The upper ends of the U-shaped members 6, 6 of each truck 4 are connected on each side by a member 16. Pivotally secured by a bolt 17 to the middle portion of each side member 16 is a shackle 18 which receives a cable 19 to which the upper end of an inverted U-shaped frame 20 is secured. As shown in Figure 8, this frame terminates at its lower ends in hook portions 21 to support a helical spring 22 which surrounds it. Hooked over the top of this spring between the legs of the frame 20 is a similar frame 23 to whose lower ends there is connected a cable 24 that is attached to one side of the body 5. The latter is constructed to imitate the fuselage of an airplane, although any other form of vehicle body may be provided if desired. (See Figures 7, 8 and 10.)

There are four of these spring suspension members connected between the shackles 18 of the trucks 4, 4 and the side ends of the fuselage 5. There is thus provided for the latter a spring suspension which is safe, since a spring, although broken, will still afford a support for its respective frame 23.

For the purpose of driving the body 5 and its trucks 4 along the track 1, I provide at the front end of said body a propeller 26, preferably of aerofoil section, that is secured to the armature shaft 27 of an electric motor 28. (See Figures 7, 12 and 13.) This motor, which is mounted on a supporting frame 29 in the front end of the body 5, is included by wires 30 in an electric circuit with a switch 31 in the rear end of said body. From this switch wires 32 lead to a trolley unit 33 secured to the plate 7 of the truck 4 from which the rear part of the fuselage 5 is supported. This trolley unit comprises a yoke piece 34 secured by a pivot pin 35 to the rear end of the plate 7. The yoke portion of the piece 34 projects beyond the plate to receive, through holes in its middle portion, a hinge pin 36 that is preferably constructed of bakelite. The ends of the yoke piece 34 project well beyond the first pin and are formed at their outer extremities with holes to receive a second cross pin 37 preferably constructed of bakelite. (See Figures 9 and 11.)

Pivotally secured to the pin 36, and suitably insulated from the yoke piece 34 which carries it, are three trolley fingers 38 formed with downwardly projecting ends 39. The latter are connected by helical springs 40 with the pin 37 carried by the outer ends of the yoke piece 34, whereby these fingers may be held in yielding engagement with wires 41 secured by insulating clamps 42 to the bottom parts of the I beam sections 1. (See Figures 2, 3 and 7.) These wires 41, in contact with which the trolley fingers 38 travel, are included by bus bars 41ª that closely hug the sides, and pass through slots in the top and bottom, of an I beam section (see Figure 10), in an electric circuit with a current supply (not shown) to furnish electric current to an electric motor 28 through the wires 32 that are connected at their upper ends by binding screws 43 to the trolley fingers.

For the purpose of quickly stopping the electric motor 28 after the electric circuit in which it is included is broken, I provide in the front part of the body 5 a conventional solenoid brake 44 whose curved friction arms 45, 45 are spring drawn into engagement with a drum 46 on the armature shaft 27 to stop the motor when the solenoid, operatively connected to said arms by well known link and lever mechanism 47, is de-energized. (See Figures 12 and 13.)

Fixedly secured to the rear end of the body 5 is a rudder 48 and an elevator 49. Within the body there is provided for the occupants a front seat 50 and a rear seat 51. (See Figure 7.)

Projecting downwardly and rearwardly from the rear bottom portion of the body 5 is a tail skid comprising two converging members 52 that terminate at their lower ends in feet 53 between which a wheel 53 is pivoted. Connected between the lower portions of the skid members 52 and the bottom part of the body 5 is a bracing rod 54.

When the carrier reaches the loading platform 55, the lower portions of the skid members 52 are received between the friction faces of two parallel clamping members 56, 56. One of these members is free to be moved toward the other by a conventional rotatable cam 57 and lever 58, to cause said members to tightly engage the skid 52 to stop the carrier at the platform after the electric motor circuit is opened by means to be hereinafter described.

At its front end the body 5 is provided with rubber wheels 59 in imitation of those employed on a conventional airplane.

Projecting from the sides of the body 5 are wings 60 which are so constructed and located as to serve as steps when the carrier is at the loading platform, to assist people in getting into, and out of, it. (See Figure 5.)

For the purpose of automatically stopping the carrier at the loading platform, I have provided over the latter a dead section 61 in each wire 41. When the trolley fingers 38 reach these dead sections 61 of the wires 41, the motor circuit will be automatically opened to stop the carrier. Between each end of the dead section and the adjacent end of the live section of each wire 41 an intermediate dead section 62 is provided. (See Figure 4.) Each end of this intermediate dead section 62 is spaced a suitable distance between the live section and the dead section 61 of each wire 41 to provide a double air gap to prevent arcing over such as would occur if the trolley fingers 38 passed directly from the live sections to the dead sections 61 of said wires.

I do not wish to be limited to the details of construction and arrangement herein shown and described, and any changes or modifications may be made therein within the scope of the subjoined claims.

Having described my invention, I claim:

1. An apparatus of the type described, comprising an aerial track line, a carrier free to roll over the latter, a body depending from said carrier, a stop rod carried by said carrier, a bumper rod coupled to the rear portion of the stop rod, and a separate carrier on the track for the bumper rod.

2. An apparatus of the type described, comprising an aerial track line, a carrier free to roll over the latter, a body depending from said carrier, a bumper rod, a pivotal coupling connecting the latter to the rear end of said body, and a wheeled truck on the aerial track line behind the carrier for supporting the rear end of the bumper rod.

3. An apparatus of the type described, comprising an overhead I beam, a pair of U shaped members straddling said I beam, wheels carried by the U shaped members for travel upon the lower flanges of said I beam, side members connecting the upper ends of said U shaped members, shackles pivotally secured to the side members and a body suspended from said shackles for carriage by them through the air under said track line.

4. An apparatus of the type described, comprising an overhead I beam, a pair of U shaped members straddling said I beam, wheels carried by the U shaped members for travel upon the lower flanges of said I beam, a body suspended from said U shaped members, a plate connecting the bottom portions of said U shaped members, inverted U shaped pieces secured to the under portion of said plate, and a bumper rod secured within said inverted U shaped pieces.

5. An overhead railway construction including in combination a guiding and supporting rail, a car, a truck having wheels thereon engaging said rail, suspension springs forming the sole connection between said car and truck, and laterally projecting wings on said car.

In testimony whereof I have hereunto set my hand this 24th day of August, 1926.

LEVITT LUZERN CUSTER.